Patented Feb. 3, 1948

2,435,555

UNITED STATES PATENT OFFICE 2,435,555

MIXED RESIN BONDED ABRASIVES AND METHOD OF MAKING THE SAME

Loring Coes, Jr., Brookfield, Mass., assignor to Norton Company, Worcester, Mass., a corporation of Massachusetts No Drawing. Application April 26, 1945, Serial No. 590,516

15 Claims. (Cl. 51—298)

This invention relates to resin bonded abrasives and methods of making them.

One object of the invention is to provide an improved, simpler and more efficient method of making resin bonded abrasive articles, such as grinding wheels or the like. Another object of the invention is to provide a practical method of making resin bonded abrasive articles by casting. Another object is to provide an improved method of making molded abrasive articles. Another object is to provide a simple and efficient method of making dense resin bonded abrasive articles.

Another object is to overcome or ameliorate the detrimental effects of water of formation during cure of abrasive and bond mixes employing certain types of resins. Another object is to provide a method of making usable phenolic-alkyd resins, heretofore found impracticable or deficient in bonding abrasives, for the efficient making of strong and substantially water-free abrasive articles.

Another object is to provide a method of making grinding wheels and the like in which wide flexibility of control of characteristics in the ultimate resin bonded grinding wheel may be provided and dependably carried out. Another object is to provide a method of compounding of abrasive and potentially reactive phenol-alkyd resinous mixes that will be capable of a wide range of control or of predetermination of the characteristics of the final abrasive product, such as grinding wheels, and thereby facilitate the efficient production of such grinding wheels to serve various and varied grinding needs. Another object is to provide methods of producing more quickly resin bonded grinding wheels.

Another object is to provide a strong phenolic-alkyd resin bonded abrasive article. Another object is to provide an abrasive article utilizing phenol-alkyd resins but devoid of the weakening and other detrimental effects heretofore inherent in such resins and heretofore precluding their satisfactory use in the making of grinding wheels and the like. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

As conducive to a clearer understanding of certain features of my invention, it might at this point be noted that, in the curing of many resins, the reaction is accompanied by the formation of water which has detrimental effects, including weakening effects, precluding satisfactory or suitable grinding wheel production in which such resins take part in bonding the abrasive grains and in the construction or formation of the bond structure upon which many important characteristics of a grinding wheel depend. For example, the strength and other physical properties of the bond affect the grain-breaking-out characteristic of the bond by which worn abrasive grains are to be released and fresh grains brought into exposure for grinding action; also such properties affect such other factors as whether or not a grinding wheel can withstand the effects of centrifugal force with an adequate margin of safety. Various expedients have in the past been resorted to, with respect to various resin-compounded bond structures. A dominant aim of this invention is to effect such control of the water of formation, in phenolic-alkyd resin compounded abrasive-bond structures as will overcome such deficiencies as are above noted and as will make feasible more definite predetermination of bond structure characteristics, unimpaired by deficiencies due to water of formation so inherent in such and other resins.

According to my invention I react the acetals of polyhydric alcohols with a mixture of a phenol and a polybasic acid anhydride, under conditions or controls which are later described and which are selectable or variable at will according to the desired grinding wheel characteristics, the resins thus produced comprising a mixture of a phenolic resin and an alkyd resin. The three just named classes comprise in the aggregate a goodly number of members or ingredients and they are usable in the above mentioned reaction in a great variety of combinations, the reaction in each case being essentially or in principle the same, as is later pointed out, and the wide variety of reactable combinations coupled with a wide range of control or extent of reaction makes it possible to produce such a large range of resin bonded abrasives whose bonds, except for the fillers or the like that may be added, comprise essentially a combination of phenolic and alkyd resins, so that a wide range or variation of desirable properties is available from which to select or determine the properties of the grinding wheel. In principle, the acetal, in the reaction accompanying curing, breaks up and forms a polyhydric alcohol and an aldehyde of which the former reacts with the anhydride to form an alkyd resin and the aldehyde reacts with the phenol to produce a phenolic resin, a feature of the reaction residing in the fact that water is formed in immaterial quantity whereby I am enabled to overcome or avoid many defects in certain known resins, particularly defects due to water of formation and defects due to non-uniform curing of the phenolic and alkyd resins. Some of the resultant resins have characteristics such as fluidity or low viscosity in the potentially reactive form or tensile strength in the cured or reacted form that far surpass those of known resins; some of the resultant resins are lower in tensile strength but retain characteristics that are new or superior as against those of known types of resins and hence such superiorities may be taken advantage of in cases of abrasive-bond structures where high tensile strength is not a desideratum. In all cases the very material advantage of immaterial water formation is present even when the compounding of the potentially reactive resin mix is carried on or controlled so that it may be at will either thermoplastic or thermosetting.

Moreover, in potentially reactive form, these resins may be employed, in the compounding of abrasive and bond mixes, either in liquid form in which case their low viscosity presents advantages of substantial practical value, or in hardened or powdered form, presenting other advantages, or, in the processing of grinding wheels, I may employ them in both liquid and powdered form, all as later described.

Of the numerous members of the three classes of starting substances or ingredients, some are less reactive than others; for example, some of the phenols are less reactive than others. But in such cases I employ a suitable catalyst of which, also, a broad class of substance is usable, as is later explained. Even with the more reactive substances I may, however, and preferably do use a catalyst and thus I am enabled, as by choice of ingredients based upon reactivity with others, or by choice of character, strength or amount of catalyst, to provide a wide range of controls or predetermination of the time element to be involved in the curing, appropriately related to temperature or temperatures of cure. Moreover, particularly in the potentially reactive liquid form, I am enabled also, by appropriate correlation of such factors as those just mentioned, to produce potentially reactive forms by my process that can be cured at relatively high temperatures in relatively short periods of time, in contrast to the imposed handicap, in certain known types of resins, of imposed low-temperature cure throughout long curing periods and thus grinding wheels can be more speedily and more efficiently produced. Other features and distinguishing coactions and characteristics are later pointed out herein.

The acetals of polyhydric alcohol consist of the formals, and the acetals of higher aldehydes, and of these there are a great many that take part in the earlier above mentioned reaction, and of the many formals and acetals that make up this general class and take part in the just mentioned reaction, it will suffice to name a number of them by way of illustration and not by way of limitation. Of the formals, the preferred or illustrative ones include the formals of such polyhydric alcohols as penta-erythritol, glycerine, erythritol, tri-methylol-propane, glycerine monochlorhydrin (which is the same as α chlorhydrin), glycol, and pentaglycerol. Of the acetals in the group or class, illustrative and preferred ones are the acetals of higher aldehydes of such polyhydric alcohols as have just been enumerated with respect to the formals, and the acetals of the following aldehydes with the just mentioned polyhydric alcohols: acetaldehyde, propionaldehyde, butyraldehyde, benzaldehyde, and furfural-aldehyde.

These acetals may all be represented by the following basic formula:

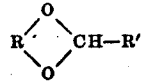

in which R is a divalent or tetravalent alkyl radical, or an hydroxy alkyl radical, or a chlorinated alkyl radical, and R' is any one of hydrogen, methyl, ethyl, propyl, phenyl, and furyl.

Any phenol of the broad class of phenols is usable; the latter include the monohydroxy phenols which are phenol, the cresols, and the xylenols, and the polyhydroxy phenols such as the dihydroxy phenols which are resorcinol, hydroquinone and catechol, and the trihydroxy phenols which are pyrogallol, oxyhydroquinol and phloroglucinol. Reactivities of these various phenols vary, as will be understood; they are all productive of resins, some coact to produce superior resins than others, some in turn coact to cause one or more qualities or characteristics of the ultimate resin to be superior over the same quality or characteristic of the resins produced by others, and according to factors such as character of grinding operation to be perfomed, grain-breaking-out strength, tensile strength of the bond structure, fillers to be employed, and the like, some of these members of the phenol class are preferably over others.

The phenols usable may thus be described as consisting of all mono and polyhydric phenols containing not more than one, or no, substituent in the 2, 4 and 6 positions of the benzene ring of the molecule; stated differently, they may be described as all mono and polyhydric phenols containing at least two unsubstituted positions, in the benzene ring of their molecule, that are ortho or para to an hydroxyl group.

This class of phenols may be represented by a basic formula as follows:

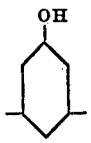

The polybasic acid anhydrides also include many members of which some are preferred to others according to the desired characteristics. Illustrative members of this class include maleic anhydride, succinic anhydride, glutaric anhydride, methyl maleic anhydride, chloromaleic anhydride, endomethylene-tetrahydrophthalic anhydride, phthalic anhydride, citric anhydride, and aconitic anhydride.

These polybasic acid anhydrides may be represented essentially by the following formula:

in which R" is an divalent alkyl or aryl radical.

Members taken from these three groups or classes react, in general, in the manner earlier above described, and the fundamental reaction is represented by the following:

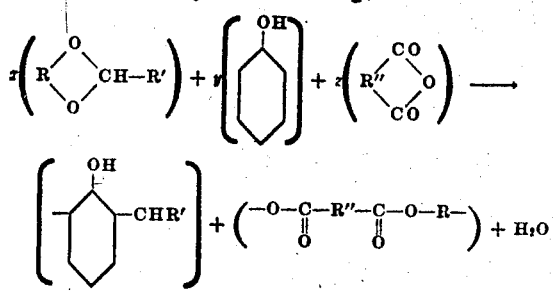

in which the first, second and third groups or formulae represent respectively the above described acetals, phenols, and polybasic acid anhydrides; the fourth group represents the phenol resin, the fifth group represents the alkyd resin, and the sixth group of course represents water. Where R is bivalent or bi-functional, the alkyd reaction product or resin is thermoplastic and where R is tetravalent or polyfunctional, the cured alkyd resin is thermosetting. In the former case the resin molecule chain is linear and in the latter the polyfunctional characteristic of R brings about cross-linking. The ratio of phenol to acetal can be varied to produce any desired amount of cross-linking of the phenolic component. If R is tetravalent, it supplies twice as much aldehyde which does the cross-linking on the phenol to form the phenol aldehyde resin component of the cured or end product.

As earlier above noted, a catalyst is employed, particularly with the less reactive phenols, and is preferably employed in any case, thus to speed up the reaction during cure and lessen the time period of heat treatment. The catalyst can be any strong acid or hydrolyzable salt of a weak base and a strong acid; strong acids such as hydrochloric, sulphuric and nitric acids are illustrative but their action is usually to speed up the reaction too much and hence it is preferred to bring them into the potentially reactive mix by way of a salt of the above mentioned character such as, for example, aniline hydrochloride, stannic chloride, ferric chloride, aluminum chloride, zinc chloride, etc. Phosphoric acid as such is usable and is an illustration of an acid that is directly employed; other illustrations of the latter type are sulphamic acid and para toluene sulphonic acid.

Also my invention is not limited to the use, in the making up of grinding wheels, of only one of each of the three above mentioned principal ingredients in that one or more of each in admixture may be employed; thus, for example, instead of using only a single phenol, mixtures of two or more phenols may be employed, such as a mixture of phenol and resorcinol. Thus a wide variety of characteristics in the end product or cured resin may be achieved and carried over into the grinding wheel bond structure, modified as may be desired by inclusion of fillers, and also a wide variety of curing temperatures and time periods of cure are possible or selectable.

Illustrative compoundings of the potentially reactive resin mix are set forth in the following table which is not intended to be all-inclusive or by way of limitation but is set forth solely as illustrative, the table giving in numbers the mols of each ingredient, thus also to set forth illustrative but not limiting molecular proportions employable. The column headed "Catalyst" is likewise not all-inclusive and is not to be interpreted in a limiting sense, the abbreviation "p. T. S. A." meaning para toluene sulphonic acid, it being noted that the catalyst in each case is included in an amount that is substantially 0.2% by weight.

| | Phenol | Acetal | Anhydride | Catalyst |
|---|---|---|---|---|
| 1 | Phenol ... 1.0 | Glycerol formal ... 1.5 | Phthalic ... 2.25 | p. T. S. A. |
| 2 | ...do... 1.0 | Glycol formal ... 1.5 | Maleic ... 1.5 | p. T. S. A. |
| 3 | Resorcinol ... 1.0 | ...do... 1.5 | ...do... 1.5 | p. T. S. A. |
| 4 | Phenol ... 1.0 | Trimethylol propane formal ... 1.5 | Phthalic ... 2.25 | p. T. S. A. |
| 5 | ...do... 1.0 | ...do... 1.5 | Maleic ... 2.25 | p. T. S. A. |
| 6 | Resorcinol ... 1.0 | ...do... 1.5 | ...do... 2.25 | p. T. S. A. |
| 7 | Phenol ... 1.0 | Pentaglycerol formal ... 1.5 | ...do... 2.25 | p. T. S. A. |
| 8 | Resorcinol ... 1.0 | ...do... 1.5 | ...do... 2.25 | p. T. S. A. |
| 9 | Phenol ... 1.0 | α Monochlorhydrin formal ... 1.5 | ...do... 1.5 | p. T. S. A. |
| 10 | Cresol ... 1.0 | Penta Erythritol formal ... 0.75 | ...do... 1.5 | p. T. S. A. |
| 11 | Phenol ... 1.1 | ...do... 0.75 | ...do... 1.5 | p. T. S. A. |
| 12 | ...do... 1.0 | ...do... 0.75 | ...do... 1.5 | p. T. S. A. |
| 13 | ...do... 1.0 | ...do... 0.75 | Phthalic ... 1.5 | p. T. S. A. |
| 14 | ...do... 1.0 | ...do... 0.75 | Succinic ... 1.5 | p. T. S. A. |
| 15 | ...do... 1.0 | ...do... 0.75 | Maleic ... 1.5 | p. T. S. A. |
| 16 | ...do... 1.0 | ...do... 0.75 | ...do... 1.5 | ZnCl₂. |
| 17 | 2.2 di(4.phenylol) Propane 1.0 | ...do... 0.75 | ...do... 1.5 | Sulphamic acid. |
| 18 | Phenol ... 1.0 | ...do... 0.75 | ...do... 1.5 | ZnCl₂. |
| 19 | ...do... 1.0 | ...do... 0.75 | Endomethylene-tetrahydro-phthalic ... 1.5 | Do. |
| 20 | ...do... 1.0 | ...do... 0.75 | Succinic Anhydride ... 0.75 / Maleic Anhydride ... 0.75 | Do. |
| 21 | ...do... 1.0 | Phenyl M. Dioxane ... 1.5 | Phthalic Anhydride ... 0.75 / Maleic Anhydride ... 0.75 | Do. |
| 22 | Phenol ... 0.5 / Xylenol ... 0.5 | Penta Erythritol formal ... 0.75 | Maleic Anhydride ... 1.5 | Do. |
| 23 | Phenol ... 0.5 / Resorcinol ... 0.5 | ...do... 0.75 | ...do... 1.5 | Do. |
| 24 | Phenol ... 0.5 / M. Cresol ... 0.5 | ...do... 0.75 | ...do... 1.5 | Do. |
| 25 | Phenol ... 0.5 / P. Phenyl Phenol ... 0.5 | ...do... 0.75 | ...do... 1.5 | Do. |

Polymerization of the above illustrative potentially reactive mixes can be effected under heat treatment at 70° C. for 18 hours followed by heating at 130° C. for 10 hours, and this cycle of heat treatment is also illustrative, being suitable in relation to the character and amount of catalyst employed, it being noted that it was selected as a matter of convenience in testing out a large number of potentially reactive mixes and that the heating cycle can be widely varied both as to temperature and time in view of selectable factors, such as those above described.

The potentially reactive mixes are in liquid form and in general are of low viscosity and hence have great ease of flow or pour, making them superior for casting into molds or forms or the like. The three principal starting ingredients are at ordinary room temperatures usually solids but have relatively low melting points, become liquid simply upon mixing them together in solid form, the resultant liquid or mix having good fluidity as above stated, while other mixes of the starting ingredients that do not thus of themselves coalesce or melt into a single liquid mass need only to be heated to bring about their melt, their low melting points not requiring heating to substantial degrees. Water production during cure is found to be not detrimental to the desired characteristics of the cured resin itself; this may be accountable for by reason of the fact that, according to the typical reaction above set forth, the proportion of water formed is so low as to be of inconsequential or immaterial effect. In contrast to water production on the order of 15% by weight in certain known resins, the cause of many deficiencies therein, precluding their satisfactory adaptation to grinding wheel production as above noted, water production according to my invention is on the order of about 4 to 7%. Moreover, expedients such as additives to dissolve or absorb water of formation, such additives usually having detrimental effects upon the end product, particularly detrimental to the bond structure in a grinding wheel, need not be resorted to.

In liquid form the potentially reactive resin may be easily and quickly interrelated with abrasive grains with or without fillers of which in turn a wide variety is known and available and which may here be selectively employed to vary as may be desired the mechanical or physical properties of the bond structure, the high fluidity of the potentially reactive liquid form of resin making for speedy and dependable wetting of the abrasive grains and also of the fine particles of such filler as may be employed, and also making it possible to make up abrasive and bond mixes with or without fillers in various advantageous ways. For example, they may be all mixed together in any mechanical mixer, using proportions to give any desired degree of plasticity, or flowability. Thus the mass may be mixed to a thick consistency and molded and subjected to heat cure. Or the potentially reactive liquid may be placed in a mold in suitable quantity and the desired amount of abrasive grain with or without filler added thereto and the resultant mass in the mold subjected to heat cure. Or the mold may be filled with the abrasive grains with or without a filler and the resultant dry granular mass, still in the mold, may be impregnated with the potentially reactive liquid resin, as by injecting the latter into the mold, whence the resultant molded grinding wheel may be subjected to heat cure.

A wide and superior range of tensile strengths is also achievable, thus also providing for a range of selection according to the intended uses or application of the resins. This range, in an upward direction, far exceeds tensile strengths achievable in certain heretofore known types of resins which, as earlier above noted, at least for the phenolic formaldehyde type, range about from 8,000 to 10,000 as a modulus of rupture; for example, the modulus of rupture of Example 14 is 26,000; of Example 15, 18,000; of Example 16, 15,500; of Example 18, 20,000; of Example 10, 12,400; and of Example 2, 12,100. Others are of lower modulus of rupture, for example, the figure for Example 6 is 7,800; for Example 5 is 8,500; and for Example 3 is 10,300.

As earlier above pointed out, any of the principal ingredients may be employed in admixture with each other, and Examples 19 and 20 are illustrations of mixtures of anhydrides employable for the anhydride constituent while Examples 22–25 are illustrative of how the phenol ingredient may be made up of mixtures of phenols. The mixtures of these examples are set forth solely by way of illustration and not by way of limitation for, as will now be clear, a substantial array of combinations of phenols or of anhydrides to make up respectively the phenol and anhydride ingredients can be made and used; likewise mixtures of acetals may be employed for the acetal ingredient, and two or more catalysts, so long as they are not undesirably reactable with each other, may be employed. The modulus of rupture of Example 22 is 18,300; of Example 23 is 15,200; of Example 24 is 12,700; of Example 25 is 10,800; of Example 19 is 14,000; and of Example 20 is 12,500. By appropriate selection, therefore, I am enabled to produce resin bonded abrasive products having mechanical strength surpassing certain known types, being on the order of two or three times as strong.

Similar advantages such as those outlined herein are obtainable when the resinous compositions, for purposes of compounding the bond structure, are made up in a form such as powdered form for molding. To make them up in such form, the procedures above described are followed to make up a potentially reactive liquid resin which is then heat treated under conditions such that the reaction is only partially carried to completion, being carried on under conditions to effect sufficient hardening, whereupon the incompletely cured and hardened mass is cooled and may then be broken up or ground up to the desired condition, such as powdered form. Inasmuch as it has been only partially cured, the product remains potentially reactive and in powdered form may then be used in making up an abrasive-bond mix. In so doing I prefer to employ some of the potentially reactive resin in liquid form as a plasticizer, its low viscosity and high fluidity making it an excellent grain wettant so that the grains may first be wetted thereby and then the potentially reactive resin in powdered form admixed therewith, the liquid plasticizing agent insuring that the grains become dependably and uniformly coated with the powdered bond material. Or I may mix, in any suitable mechanical mixer, the desired or suitable proportions of abrasive grains, potentially reactive resin in powdered form, and the same potentially reactive resin in liquid form. In either case fillers such as those above mentioned may be added and intermixed therewith. The resultant plastic mass may then be molded and pressed and then subjected to heat treatment to effect cure of both forms of potentially reactive resin present.

In the preparation of the powdered form of material, conversion of the potentially reactive liquid form of the resin to the potentially reactive solid form will vary as to temperature and time, depending upon such factors as the reactivity of the starting ingredients, the character and amount of catalyst employed, etc., etc., as will now be clear in view of all of the foregoing, the heating cycle being in each case appropriately suited to avoid carrying the reaction to completion and simply to carry the reaction only far enough to effect appropriate solidification or hardening of the potentially reactive mix. The heating cycle is thus to be understood to be widely variable in view of selectable factors such as those just mentioned. Illustratively, a cycle of heat treatment may be at 70° C. for 48 hours. Conversion to potentially reactive solid form is applicable both when the potentially reactive liquid resin is compounded for thermosetting and when it is compounded to be thermoplastic.

The subsequent heat cycle to effect completion of the reaction of the molded resin, whether compounded for thermosetting or thermoplasticity, will likewise vary widely with such selectable or controllable factors as those above mentioned and, of course, can further vary with the shape or mass of the molded potentially reactive resin. For example, and as is well known, a relatively thin molded abrasive article cures faster than a thick or massive molded abrasive article. An illustrative heat cycle to effect final conversion or to effect completion of the reaction can be heat treatment at 175° C. for 24 hours.

An illustrative procedure or example is set forth as follows: 1.2 mols of phenol, 0.75 mols of penta erythritol formal, and 1.5 mols of maleic anhydride, with 0.5% by weight of zinc chloride as the catalyst is made up into a liquid mix which, as in the illustrative examples above given, is of course potentially reactive. That liquid mix was heated for 48 hours at 70° C. to carry the reaction far enough to effect hardening, whence the mass was cooled to room temperature and ground up into powdered form, giving a potentially reactive resin in solid form as distinguished from liquid form. The proportions used in this illustration are such as to give a thermosetting resin upon final conversion or cure. In powdered form it was used for molding under pressure and then subjected to a heat cycle of 175° C. for 24 hours. The catalyst, it will be understood, does not react or take part in the reaction and hence is present in the solid or powdered form of potentially reactive resin which when subjected to the final heat cure carries the polymerization or reaction to completion under the effect of the catalyst.

As above noted, the advantages earlier above described, particularly with respect to the water or H2O factor, are fully realizable whether the bond ingredients of my invention include the potentially reactive resin either in liquid or solid (powdered) form or both. In any case, a feature of the reaction in effecting cure of the abrasive articles resides in the fact that water is formed in the bond structure in immaterial quantity or is due to the fact that the specific nature of the reaction, typified in the generic or fundamental equation of reaction earlier above set forth, does not permit or so controls water formation that its effect on or in the resinous bonded abrasive structure is not detrimental or its formation is in amount insufficient to produce any detrimental effects. Furthermore, according to my invention, I achieve also definite or positive control of the respective rates at which the phenol aldehyde resin component and the alkyd resin component, in the resinous bonded abrasive structure, are formed, and thus, in the resinous bonded abrasive structure, there is the same degree or extent of cure as to both types of resins, that is, if the reaction is carried to completion as is of course desired in the final product, all of the components that form the phenol aldehyde resin are reacted and all of the components that form the alkyd resin are reacted. As a result the bond structure also has great strength. In the bond structure there is thus no contamination or weakening of a resin that is completely reacted or cured by such components of the other resin as are not completely reacted, for incompleteness of reaction of such components can be and is prevented according to my invention. Moreover, throughout the reaction, the respective rates at which the components that form the two resins are controllable may be made to be the same so that as the reaction proceeds, the production and cure of each of the two resins proceeds in step or in synchronism. These factors favorably affect such advantages as strength of the bond structure and homogeneity of the two types of resins therein.

These controls arise out of the coactions of the ingredients initially employed, all as is indicated in the above equation of reaction; the acetal employed has, as earlier above pointed out, the characteristic of breaking up to supply two components, namely, an alcohol and an aldehyde with which the anhydride and the phenol are respectively reactive to form respectively an alkyd resin and a phenolic resin. The phenol cannot react with the aldehyde to form a phenolic resin at a rate different from the rate at which the alcohol reacts with the anhydride to form the alkyd resin, and vice versa, because these respective reactions in turn are dependent upon the rate at which the acetal breaks up to supply, at a corresponding rate, the respective components which the phenol and the alcohol respectively require for reaction. For example, even though a highly reactive phenol and a lesser reactive anhydride were to be employed, with such an acetal, the highly reactive phenol can react during cure only at the rate at which the acetal supplies to it the aldehyde and thus the formation of the phenolic resin is held down to the rate at which the lesser reactive anhydride reacts with the alcohol at the rate at which the latter in turn is provided to it for reaction. Neither resin is thus formed more rapidly than the other. The presence of the catalyst, acting to speed up where necessary the entire reaction, insures that a lesser reactive ingredient such as a lesser reactive phenol or a lesser reactive anhydride, reacts at least at the rate at which its companion component is supplied by the breaking up of the acetal and thus prevents a lesser reactive component or ingredient from falling behind, in its reaction, the rate at which the acetal makes the companion component available. By such coactions unimpaired strength of the bond structure is achievable and neither resin component is permitted to have a weakening effect upon the other or upon the composite resinous bond structure.

As above noted, the potentially reactive resin can be compounded to become either thermosetting or thermoplastic, by properly relating the respective quantities employed in making up the mix. The general rules or guides to follow are as follows:

For thermosetting, where the acetal is a mono acetal (such as glycol formal), the molecular proportions to employ are 1 mol of the mono acetal, ⅔ to 1 mol of the phenol, and 1 mol of the acid anhydride, and where the acetal is a di-acetal (such as the penta erythritol diformal), 1 mol of the di-acetal, 1⅓ to 2 mols of phenol, and 1 to 2 mols of the acid anhydride.

When the end product is to be thermoplastic, the molecular proportions in the case of mono acetals are 1 mol of the mono acetal, 1 mol of phenol, and 1 mol of acid anhydride, and in the case of the di-acetals are 1 mol of di-acetal, 2 mols of phenol, and 1 mol of acid anhydride.

The coefficients $x$, $y$ and $z$ of the above equation of reaction will now be seen to be the respective mols to employ in proportioning the starting ingredients and represent also the respective mols set forth in the various and numerous illustrative examples above set forth.

It will thus be seen that there has been provided in this invention a method and product in which the various objects hereinbefore set forth, together with many thoroughly practical advantages, are successfully achieved. As various possible embodiments might be made of the mechanical features of the above invention and as the art herein described might be varied in various parts, all without departing from the scope of the invention, it is to be understood that all matter hereinabove set forth is to be interpreted as illustrative and not in a limiting sense.

I claim:

1. The method of making an abrasive article which comprises the steps of mixing abrasive grains and a mixture for forming a phenol-alkyd resin upon heating said mixture, said mixture comprising a phenol containing at least two unsubstituted positions in the benzene ring that are ortho or para to a hydroxyl group, penta erythritol diformal, and a dicarboxylic acid anhydride in such proportions as to produce on heating a mixture of a thermo-set phenol formaldehyde resin and a thermo-set alkyd resin, said thermo-set mixture being without excess of formaldehyde and having a modulus of rupture greater than 10,800, and heating the mixture of said abrasive grains and said resin-forming mixture.

2. The method of making an abrasive article which comprises the steps of mixing abrasive grains and a mixture for forming a phenol-alkyd resin upon heating said mixture, said mixture comprising a phenol containing at least two unsubstituted positions in the benzene ring that are ortho or para to a hydroxyl group, penta erythritol diformal, and a dicarboxylic acid anhydride in such proportions as to produce on heating a mixture of a thermo-set phenol formaldehyde resin and a thermo-set alkyd resin, said thermo-set mixture being without excess of formaldehyde and having a modulus of rupture greater than 10,800, casting the mixture of abrasive grains and said resin-forming mixture into a mold and heating the same.

3. An abrasive product comprising abrasive grains held in a bond structure that comprises the thermo-set reaction products produced by heating a mixture comprising a phenol containing at least two unsubstituted positions in the benzene ring that are ortho or para to a hydroxyl group, penta erythritol diformal, and a dicarboxylic acid anhydride in such proportions as to produce on heating a mixture of a thermo-set phenol formaldehyde resin and a thermo-set alkyd resin, said thermo-set mixture being without excess of formaldehyde and having a modulus of rupture greater than 10,800.

4. The method of making an abrasive article comprising the steps of wetting abrasive grains with a liquid mixture, said mixture comprising a phenol containing at least two unsubstituted positions in the benzene ring that are ortho or para to a hydroxyl group, penta erythritol diformal, and a dicarboxylic acid anhydride in such proportions as to produce on heating a mixture of a thermo-set phenol formaldehyde resin and a thermo-set alkyd resin, said thermo-set mixture being without excess of formaldehyde and having a modulus of rupture greater than 10,800, and heating the mixture of abrasive grains and said resin-forming mixture.

5. The method according to claim 1 wherein the resin mixture contains an acid catalyst.

6. The method according to claim 1 wherein the dicarboxylic acid anhydride is maleic anhydride.

7. The method according to claim 1 wherein the phenol of the resin mixture is phenol.

8. The method according to claim 1 wherein the phenol of the resin mixture is phenol and cresol.

9. The method in accordance with claim 7 wherein the dicarboxylic acid anhydride is maleic anhydride.

10. The method according to claim 8 wherein the dicarboxylic acid anhydride is maleic anhydride.

11. The abrasive product according to claim 3 wherein the dicarboxylic acid anhydride is maleic anhydride.

12. The abrasive product according to claim 3 wherein the phenol is phenol.

13. The abrasive product according to claim 3 wherein the phenol is phenol and cresol.

14. The abrasive product according to claim 12 wherein the dicarboxylic acid anhydride is maleic anhydride.

15. The abrasive product according to claim 13 wherein the dicarboxylic acid anhydride is maleic anhydride.

LORING COES, Jr.

REFERENCES CITED

The following references are of record in the file of this patent:

UNITED STATES PATENTS

| Number | Name | Date |
|---|---|---|
| Re. 21,252 | Kistler | Oct. 31, 1939 |
| 906,219 | Grognot | Dec. 8, 1908 |
| 1,901,325 | Novotny | Mar. 14, 1933 |
| 1,975,246 | Zwilgmeyer | Oct. 2, 1934 |
| 2,005,499 | Hill | June 18, 1935 |
| 2,052,093 | Honel | Aug. 25, 1936 |
| 2,070,158 | Elber et al. | Feb. 9, 1937 |
| 2,111,248 | Novotny | Mar. 15, 1938 |
| 2,202,765 | Guth | May 28, 1940 |

FOREIGN PATENTS

| Number | Country | Date |
|---|---|---|
| 368,966 | Great Britain | Mar. 17, 1932 |